(12) United States Patent
Rolston et al.

(10) Patent No.: US 9,176,747 B2
(45) Date of Patent: Nov. 3, 2015

(54) USER-APPLICATION INTERFACE

(75) Inventors: Mark Edward Rolston, Austin, TX (US); Jared Leigh Ficklin, Austin, TX (US); Michael Andrew Nairn, Austin, TX (US); Mark Richard Ligameri, Austin, TX (US); Neil Wade Everette, Austin, TX (US); Judah Gamliel Hahn, Ofra (IL); David Koren, Raanana (IL)

(73) Assignee: SANDISK IL LTD., Kfar Saba (IL)

( * ) Notice: Subject to any disclaimer, the term of this patent is extended or adjusted under 35 U.S.C. 154(b) by 485 days.

(21) Appl. No.: 12/371,928

(22) Filed: Feb. 17, 2009

(65) Prior Publication Data

US 2010/0211872 A1     Aug. 19, 2010

(51) Int. Cl.
- *G06F 3/048* (2013.01)
- *G06F 9/44* (2006.01)
- *G06F 3/0482* (2013.01)
- *G06F 3/0483* (2013.01)
- *G06F 3/0485* (2013.01)
- *G06F 3/0486* (2013.01)
- *G06F 3/0488* (2013.01)

(52) U.S. Cl.
CPC ............ *G06F 9/4443* (2013.01); *G06F 3/0482* (2013.01); *G06F 3/0483* (2013.01); *G06F 3/0485* (2013.01); *G06F 3/0486* (2013.01); *G06F 3/04883* (2013.01)

(58) Field of Classification Search
USPC .......................... 715/790, 830, 838, 767, 837
See application file for complete search history.

(56) References Cited

U.S. PATENT DOCUMENTS

| | | | |
|---|---|---|---|
| 5,060,135 A * | 10/1991 | Levine et al. ................. | 715/769 |
| 5,847,709 A * | 12/1998 | Card et al. .................... | 715/850 |
| 6,262,732 B1 * | 7/2001 | Coleman et al. .............. | 715/835 |
| 6,377,286 B1 | 4/2002 | Hochmuth | |
| 6,466,237 B1 * | 10/2002 | Miyao et al. .................. | 715/838 |
| 7,536,650 B1 * | 5/2009 | Robertson et al. ............. | 715/767 |
| 7,543,234 B2 * | 6/2009 | Daniels et al. ................ | 715/742 |

(Continued)

FOREIGN PATENT DOCUMENTS

| | | |
|---|---|---|
| WO | 2008086056 A2 | 7/2008 |
| WO | 2009143075 A2 | 11/2009 |

OTHER PUBLICATIONS

Cooper, Katy et al., "A Comparison of Static and Moving Presentation Modes for Image Collections," dated May 23-26, 2006, pp. 381-388, Venezia, Italy.

(Continued)

*Primary Examiner* — Tadeese Hailu
(74) *Attorney, Agent, or Firm* — Toler Law Group, PC

(57) ABSTRACT

A user interface apparatus includes a display device, display application, and processor. The display device includes a display area, and the display area includes an active area. The processor and display application are configured to display application stacks, each of which may be moved into and out of the active area in response to user input, and each of which contains one or more stack cards. Each application stack is associated with a computer application, and each stack card represents a content entity capable of being operated on by the computer application corresponding to its application stack. When an application stack is in the active area the application stack is activated such that its stack cards are displayed in sequence and at least one of them may be selected. Selecting a stack card causes the corresponding computer application to be executed and to operate on the corresponding content entity.

23 Claims, 7 Drawing Sheets

(56) References Cited

U.S. PATENT DOCUMENTS

| | | | |
|---|---|---|---|
| 7,694,236 B2* | 4/2010 | Gusmorino et al. | 715/838 |
| 2005/0192924 A1* | 9/2005 | Drucker et al. | 707/1 |
| 2005/0210416 A1* | 9/2005 | MacLaurin et al. | 715/851 |
| 2006/0036568 A1* | 2/2006 | Moore et al. | 707/1 |
| 2007/0070066 A1* | 3/2007 | Bakhash | 345/419 |
| 2008/0034317 A1 | 2/2008 | Fard et al. | |
| 2008/0062141 A1* | 3/2008 | Chandhri | 345/173 |
| 2008/0165153 A1 | 7/2008 | Platzer et al. | |
| 2008/0168367 A1 | 7/2008 | Chaudhri et al. | |
| 2008/0307335 A1* | 12/2008 | Chaudhri et al. | 715/764 |
| 2008/0307359 A1* | 12/2008 | Louch et al. | 715/835 |
| 2008/0307362 A1* | 12/2008 | Chaudhri et al. | 715/835 |
| 2009/0293007 A1* | 11/2009 | Duarte et al. | 715/767 |
| 2010/0115457 A1* | 5/2010 | Bombolowsky et al. | 715/782 |

OTHER PUBLICATIONS

Mander, Richard et al., "A 'Pile' Metaphor for Supporting Casual Organization of Information," published May 3, 1992, pp. 627-634.

Agarawala, Anand et al., "Keepin' It Real: Pushing the Desktop Metaphor with Physics, Piles and the Pen," CHI 2006 Proceedings, Interacting with Large Surfaces, Apr. 22-27, 2006, pp. 1283-1292, Montreal, Quebec, Canada.

Wang, Qian Ying et al., "Piles Across Space: Breaking the Real-Estate Barrier on Small-Display Devices," International Journal of Human-Computer Studies 67 (2009), <http://www.sciencedirect.com>, available online Nov. 17, 2008, pp. 349-365, Elsevier Ltd.

Notification of Transmittal of the International Search Report and the Written Opinion of the International Searching Authority, or the Declaration received for International Application No. PCT/US2010/020928 from the International Searching Authority (EPO) mailed Sep. 27, 2010, 26 pages.

Office Action issued May 31, 2013 in Chinese Application No. 201080005996.5, with English translation, 35 pages.

International Preliminary Report on Patentability for International Application No. PCT/2010/020928, issued Aug. 23, 2011, 17 pages.

Office Action issued Jan. 6, 2014 in Chinese Application No. 201080005996.5 with English Translation, 37 pages.

* cited by examiner

USER-APPLICATION INTERFACE

FIELD OF THE INVENTION

The present invention relates generally to user interfaces and content/application management system and more specifically to facilitating the access to content and the execution of computer applications via user interfaces for computer devices, as well as to related systems and methods.

BACKGROUND

Mobile phones, and computer devices in general, typically use a grid-based application menu that allows users to interface with various computer applications. In a grid-based application menu, application icons are fixed in specific locations on a two-dimensional image plane (viewed area) of a display screen, such that the locations of the icons are specifiable by reference to an x coordinate and a y coordinate of a hypothetical grid superimposed on the image plane. (Even though the image plane may be effectively scrollable and in that sense the location of the icons relative to the frame of the display screen or to the device housing may change, the icons remain fixed in place on the grid and relative to each other, when the grid is thought of as extending beyond the frame of the display screen to cover a hypothetical entire area occupied by the icons; in this sense, scrolling of the image plane amounts to merely moving the grid.) Upon turning on a grid-based device (e.g., a mobile phone), application icons are initially displayed on the device's display device as a user-device interface by which the user interacts with the computer applications. FIG. 1A and FIG. 1B depict exemplary grid-based application menus.

FIG. 1A depicts a typical "iPhone" user interface 100. "iPhone" user interface 100 includes interactive application icons where each interactive application icon allows a user of iPhone user interface 100 to launch and use a specific computer application. For example, selecting "SMS" icon 110 by the user, for example, by touching "SMS" icon 110, would cause the SMS application associated with icon 110 to open on the screen of the iPhone device. The open SMS application would then permit the user of the iPhone device to select content entities which, in this case, are SMS messages, from a list of SMS messages.

FIG. 1B depicts a typical "Nokia N73" phone application menu 120 that includes interactive application icons where each interactive icon allows a user to launch and use a specific computer application. For example, selecting "Contacts" icon 130 by the user, for example, by touching icon 130, would cause the "Contacts" application associated with icon 130 to open on the screen of the phone device. The user of the phone device would then be able to use the "Contacts" application to select content entities which, in this case, are contact entries of a specific person, from a list of entries. Likewise, selecting "Messages" icon 140 by the user would cause a "Messages" application associated with icon 140 to open on the screen of the phone device. The user of the phone device would then be able to use the "Messages" application to view a list of content entities, which, in this case, are messages, and select a message of interest (e.g., to display the entire or original message).

With a grid-based application menu, content is stored and accessed hierarchically. That is, content is retrieved by navigating through menus, sub-menus, sub-sub-menus, etc. to reach the content items (e.g. contact entries in a contact list, emails in an email folder, etc.). While such a hierarchical arrangement of content is logical and in that sense intuitive and therefore easy for users to learn how to navigate, it is not necessarily the most practical or user-friendly arrangement of content. In a hierarchical arrangement of content, all information is more or less equally difficult to access (with certain exceptions, e.g. contact lists are generally organized alphabetically, emails are generally arranged chronologically, etc.). In this respect, it may be said that the content stored on the device is "buried" within the storage of the device. Conventional hierarchical arrangements do not (adequately) organize information according to likelihood of use. That is, content that is more likely to be used is not rendered more easily or more quickly accessible than other content. For example, frequency of use may be correlated with likelihood of use. In a hierarchical arrangement, each subsequent retrieval, within a short period of time, of the same content item is equally as difficult (or tedious or inconvenient) and time-consuming as the first retrieval, e.g. requires the same number of steps, e.g. navigating through the same number of menus and submenus, to reach the same storage location of the content. Moreover, navigating from menu to (sub)menu and from item to item (or searching items) at a given hierarchical level is in itself often inconvenient, tedious and slow.

It would therefore be useful and advantageous to provide a user interface and content/application management system that is more practical, convenient and user-friendly, specifically, that renders desired content (e.g. content that is more likely to be used) more easily and quickly accessible, so as to reduce the difficulty, tedium (e.g. number of user actions), and time required to access desired content.

SUMMARY

It would, therefore, be beneficial to have a more convenient user interface and content/application management system, or user-application interaction system. Various embodiments are designed to implement such interfaces and systems, examples of which are provided herein.

According to the present disclosure, a user interface apparatus is provided, including a display device, a display application, and a processor. The display device has a display area, and the display area has an active area. The processor and the display application are jointly configured to display on the display area any of a plurality of application stacks, each of the application stacks being movable into and out of the active area in response to user input, and each of the application stacks containing one or more stack cards. Each of the application stacks is associated with a respective corresponding computer application, and each of the stack cards represents a respective corresponding content entity capable of being operated on by the computer application corresponding to the application stack containing the stack card representing the content entity. When a given one of the application stacks is in the active area the given application stack is activated such that the one or more stack cards contained in the given application stack are displayed in a stack card sequence and at least one of the stack cards contained in the given application stack may be selected. The selecting of a stack card causes the respective computer application corresponding to the given application stack to be executed and to operate on the content entity represented by the selected stack card. A computer device including the user interface apparatus is also provided, as are related methods.

BRIEF DESCRIPTION OF THE DRAWINGS

Various exemplary embodiments are illustrated in the accompanying figures with the intent that these examples not be restrictive. It will be appreciated that for simplicity and clarity of the illustration, elements shown in the figures referenced below are not necessarily drawn to scale. Also, where considered appropriate, reference numerals may be repeated among the figures to indicate like, corresponding or analogous elements. Of the accompanying figures.

DETAILED DESCRIPTION

Figures 1A, 1B:
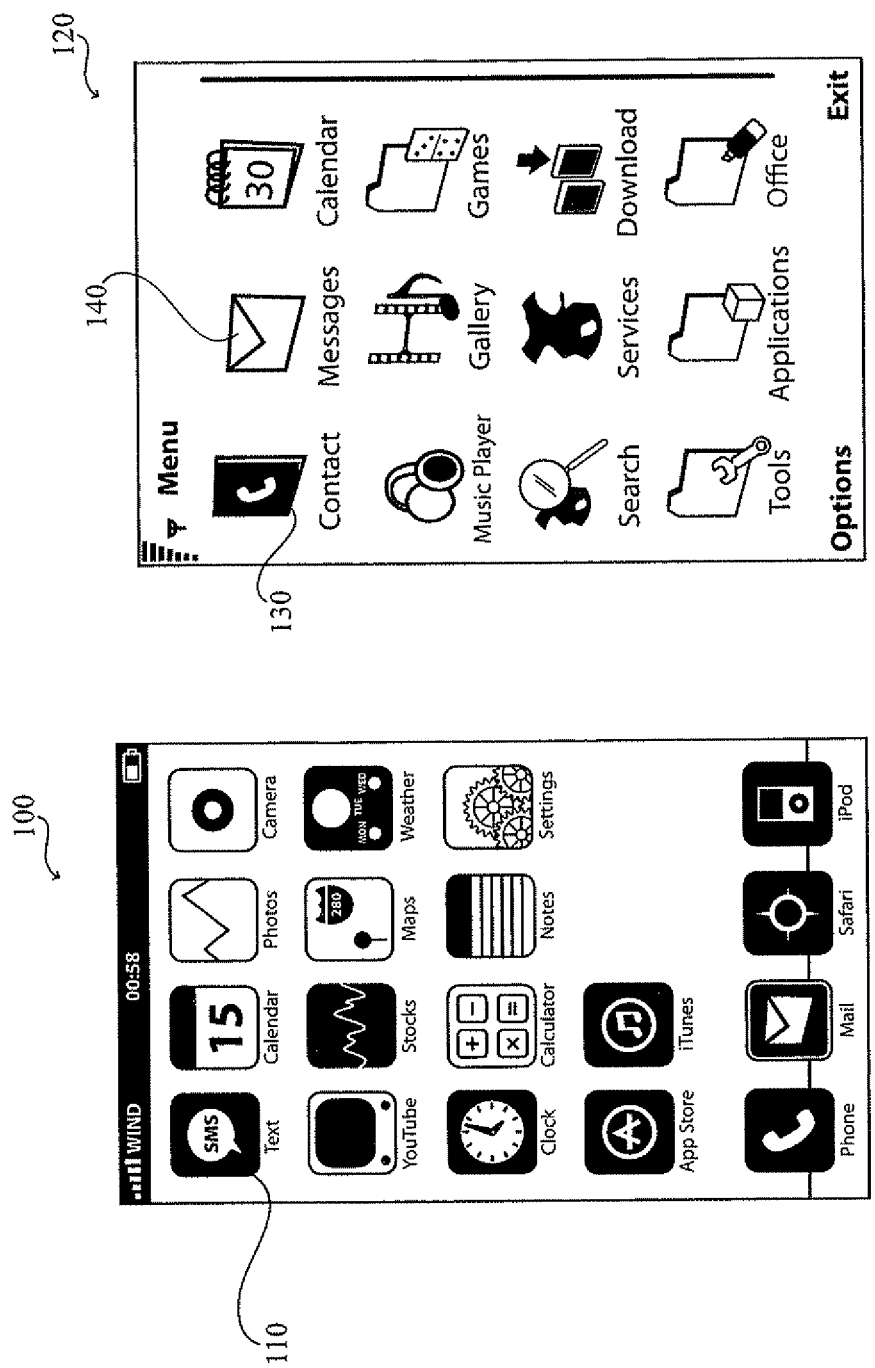
FIGS. 1A and 1B (prior art) depict grid-based user interfaces.

The description that follows provides various details of exemplary embodiments. However, this description is not intended to limit the scope of the claims but instead to explain various principles of the invention and the manner of practicing it.

According to an example embodiment, a "stack" or "application stack" may be created for each computer application operating on a computer device. (If desired, a stack may be created for only some of the computer applications, not all.) An example of a computer application would be an email program, a calendar program, a phone contact list program, a photo album/editor program, etc.

Each stack is populated with stack cards. A stack card is a representation of a content entity. A content entity is, for example, an email, a text message, a contact entry in a phone contacts list, a member entry of a membership/friends list of an (e.g. online) social community, a calendar entry, a (e.g. digital) photo, a video file, an audio (e.g. music) file, etc. A stack card could be a modified version of the content entity, e.g. down-sized or down-scaled image thereof, e.g. an icon with information identifying the content entity, or a thumbnail (e.g. of a photo). The stack card is designed for ease of manipulation by a user, e.g. moving to a different (logical) location.

Each stack card may be uniquely associated with (and hence contain some information uniquely identifying) a respective content entity. Each stack may be uniquely associated with a respective computer application. The stack cards of a given stack may be uniquely associated with that stack and with the computer application associated with that stack, e.g. the stack cards of the given stack may each represent a content entity operable on by the computer application associated with the stack. For example, there may be an email stack containing email stack cards representing emails operable on by an email program.

It may be the case that all the content entities (stored on, stored in association with, or otherwise associated with a computer device) associated with a given stack and computer application are stacked on the computer device, i.e. represented by a stack card. It may be the case that only selected content entities, or only selected content entities of a given type (i.e. associated with a given stack/application), are stacked. In this case, a content entity may be stacked if it satisfies a given stacking rule, while content entities not satisfying the given stacking rule are not stacked. Stacking rules are discussed below.

As will be clear from the description herein, the use of application stacks and stack cards, and in particular the manner of their display or presentation and their ability to be manipulated (e.g. moved in position, or selected for operation on by an associated computer application), facilitate access to and use of content.

It should be noted that the description, terminology and illustration of application stacks and stack cards generally given herein are not to be taken as limiting in any way the configuration, format, etc. (e.g. size, shape, design, etc.) of the application stacks and stack cards that may be employed herein, displayed or otherwise presented to a user. The specific terminology, description and illustrations given generally herein, while representing certain embodiments, do not exhaust the possible range of variation of the concepts and implementations disclosed herein. While the terms "application stack" and "stack card" are used to refer to specific embodiments disclosed herein and to facilitate understanding of the ideas and implementations presented in this disclosure, it is to be understood that this disclosure could also be presented or written in terms of "groups" and "data objects" in the generic, lay or non-technical senses of those terms (instead of "application stacks" and "stack cards," respectively). For example, it is not necessary that stack cards and application stacks resemble file cards in a rolodex or file cabinet, as suggested by the figures. Thus, as will be clear from context and from the knowledge of one of ordinary skill to the art as applied to this disclosure, the terminology used herein is to be understood in its ordinary or plain meanings but also to admit of such broader application.

Figure 2:
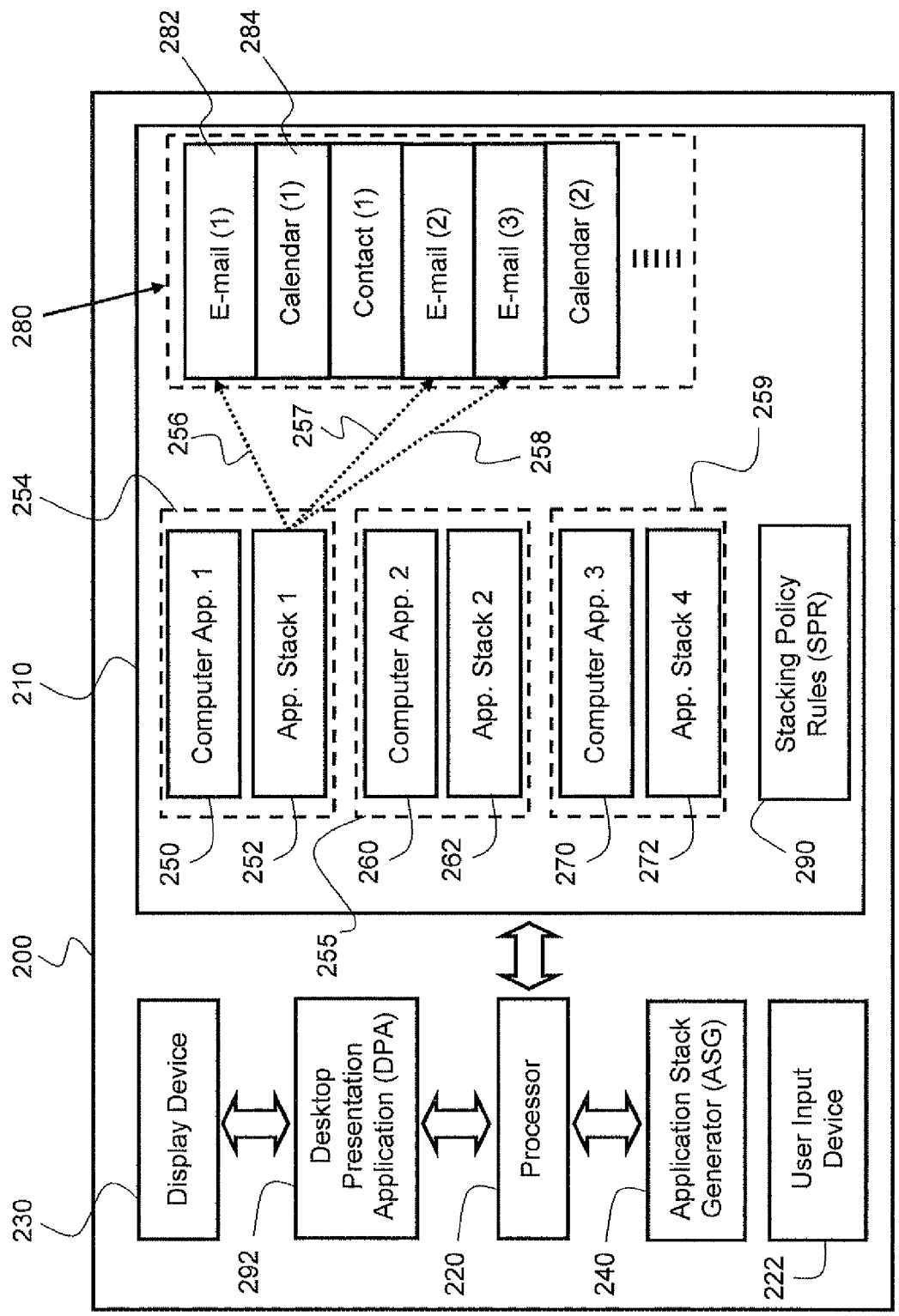
FIG. 2 is a block diagram of a computer device according to an example embodiment.

FIG. 2 is a simplified block diagram of a computer device 200 according to an example embodiment. Computer device 200 includes a storage device 210, a processor 220, a display device 230, and an application stack generator ("ASG") 240. Although, as generally suggested by the following description, computer device 200 may be, for example, a mobile phone, a Personal Data Assistant ("PDA"), a mobile computer, a Global Positioning System ("GPS"), or the like, computer device 200 is not limited to such devices but could be, e.g., a personal computer or the like, or another computer device of any type or size. Display device 230 is likewise not limited to a display screen of a mobile phone, PDA, mobile computer or GPS, but may be a monitor for a personal computer, a large size monitor as would be used for TV/video/etc., or another display device of any type or size. Where computer device 200 is a mobile phone, PDA, mobile computer, GPS or device of similar size, it may be particularly suitable for display device 230 to include a touch screen as a user input device. Arrow keys, a keyboard, a mouse, or any other user input device may also be used, as appropriate per the size of the associated display device 230 and/or computer device 200. In contrast to the illustration of FIG. 2, components of computer device 200 need not be physically co-located, as will be understood by one of ordinary skill in the art. For example, display device 230 and/or storage device 210 may be located in one or more physically separate devices. In such case, to continue the example, elements 230 and/or 210 would be replaced in FIG. 2 by a display interface and a storage interface, respectively.

Storage device 210 stores computer applications for execution on computer device 200. By way of example, storage device 210 stores three computer applications, which are designated as "Computer App. 1" (shown at 250), "Computer App. 2" (shown at 260), and "Computer App. 3" (shown at 270). "Computer App. 1" may be, for example, an e-mail application; "Computer App. 2" may be, for example, a Contacts application; and Computer App. 3 may be, for example, a Calendar application. Of course, alternative and/or additional computer applications may be (e.g., stored on storage device 210 and) used by computer device 200.

Storage device 210 also stores a database 280. Database 280 contains metadata and/or interpretive information that pertains to content entities that are associated with (e.g., usable or displayable by) computer applications that are stored on storage device 210. "Content entity" references any type of file or content that is displayable or presentable on display device 230 or otherwise to the user of computer device 200. By way of example, the upper database entry 282 contains metadata and/or interpretive information for an e-mail message designated as "E-mail (1)"; the next database entry 284 contains metadata and/or interpretive information for a calendar item designated as "Calendar (1)", and so on.

Processor 220 updates the content of database 280 as the user deletes content entities from storage device 210 and as computer device 200 receives new content entities from the user. Processor 220 may sort the content of database 280 according to predetermined criteria. For example, processor 220 may first group the content of database 280 according to the type of the content entities, where each group corresponds to a different computer application, and, then, processor 220 may sort each group according to another criterion, which may be, for example, the degree of importance of the content entities or the time at which computer device 200 receives the content entities.

Processor 220, in conjunction with application stack generator (ASG) 240, creates an application stack for every computer application that is stored on storage device 210, or only for selected computer applications. By way of example, a first application stack (which is referred to as "Application Stack 1" 252) is shown associated with a first computer application (which is referred to as "Computer App. 1" 250), the association therebetween being represented by dashed box 254; a second application stack (which is referred to as "Application Stack 2" 262) is shown associated with a second computer application (which is referred to as "Computer App. 2" 260), the association therebetween being represented by dashed box 255; and a third application stack (which is referred to as "Application Stack 3" 272) is shown associated with a third computer application (which is referred to as "Computer App. 3" 270) the association therebetween being represented by dashed box 259.

Each application stack that processor 220 creates (i.e., in conjunction with ASG 240) for a particular computer application includes one or more stack cards, where each stack card uniquely represents one content entity that is held in database 280 and that is associated with the particular computer application. For example, assuming that Computer App. 1 250 is an e-mail application, App. Stack 1 252 includes stack cards (the stack cards are not shown in FIG. 2) that represent respective e-mail messages: a first stack card may represent a first e-mail message designated as "E-mail (1)" (the representation is shown by dotted arrow 256; a second stack card may represent a second e-mail message designated as "E-mail (2)" (the representation is shown by dotted arrow 257); a third stack card may represent a third e-mail message designated as "E-mail (3)" (the representation is shown by dotted arrow 258); and so on.

Processor 220 determines which content entities should be represented by stack cards (i.e. have stack cards created for them) based on stacking policy rules (SPR") 290. Stacking policy rules 290 may, but need not, be formulated as criteria believed to be correlated with likelihood of use (of the content). For example, a stacking policy rule may indicate to processor 220 that an e-mail should be represented by a stack card only if the e-mail was received during the last 2 days; or that only the five most recent e-mails should be represented by stack cards; or that an e-mail should be represented by a stack card only if it requests a "Read receipt", or that a e-mail should be represented by a stack card only if it was read, etc. Different stacking policy rules 290 could, but need not, be applied to incoming emails and outgoing emails, or the like. Different stacking policy rules 290 may, but need not, be applied to different types of content entities (i.e. content entities associated with different computer applications), e.g. emails may be stacked based on date of receipt while contact entries of a phone contacts list may be stacked based on date of last use, or the like. Stacking policy rules may be parsed or maintained by an external application or by a module integrated into the DPA 319, or may be applied individually by each computer application in regard to its own stack. Stacking policy rules 290 may be set independently of a user (e.g. prior to initial sale of the device) or may be set by a user, and in either case may be alterable by a user, and processor 220 may accordingly update stacking policy rules 290 in response to user input. The user input may be transferred to processor 220 through a user input device 222. User input device 222 may be any suitable such device known in the art, for example, a Graphical User Interface ("GUI"), user-depressible buttons, etc.

It is possible for processor 220 to create a stack card for every content entity, that is, not to limit the creation of stack cards to only selected content entities based on the application of stacking policy rules 290 to content entities. In this case, stacking policy rules 290 would not be used in the creation of stack cards.

It is also possible for processor 220 to limit the number of stack cards created, e.g. to conserve system resources or for other reasons. It is also possible to create a stack card for every content entity but to limit the number of stack cards that are displayed. (The stack cards may, but need not, exist as logical entities independent of whether or not they are displayed.)

Since a content entity may at one time satisfy the applicable stacking policy rule and at a subsequent time not satisfy it, a stack card may be created (and possibly displayed) for that content entity and subsequently be destroyed (and/or cease to be displayed).

In addition to performing the function of determining which content entities have stack cards created for them, stacking policy rules 290 perform other functions, notably determining the order of stack cards in a stack and determining the order of application stacks. (Thus stacking rules 290 include different types of stacking rules 290 for performing different functions.)

As will be clear, the order or position of a stack card in a stack is relevant to the accessibility of the content entity represented by the stack card. The order of a stack card in a stack may be determined by a stacking policy rule 290. Examples of such rules in this regard include ordering according to recentness of use (e.g. for contact entries of a phone contact list), ordering according to recentness of receipt (e.g. for emails), ordering according to recentness of editing (e.g., for word processing files), etc. Thus, e.g., the first email in a stack may be the most recently received, the second may be the next most recently received, and so on. Of course, different stacking policy rules 290 may be used for different stacks. While rules correlated with likelihood of use may presumably be desirable, any suitable rules may be employed. The rules may be set independently of the user. The rules may be made alterable by the user. The rules may be made settable by the user.

As stated, display device 230 may be a display screen of a mobile phone, PDA, mobile computer GPS, a monitor of a personal computer or a TV/video/etc. device, or other display device. As such, display device 230 may be a display screen of a finite size. Such a display device 230 is physically constrained by its size as to the number of stack cards that can be displayed at any given time. (This assumes, of course, that the size of each individual stack card, or at least of the individual stack card selected by the user at any given time, may not fall below a minimum size necessary for ease of visibility for the user.) Accordingly, it may be the case that not all the stack cards created or intended for display for a given stack fit on the display screen at any given time. In such case, cards may be selected for display/non-display according to the same ordering principle that is in effect for the stack. For example, if the display screen accommodates ten cards in a stack, and an email stack is ordered by recentness of receipt, only the first 10 most recent emails will have cards representing them be included in the stack. When a new email arrives, it will be placed at the front of the stack, causing the $10^{th}$ most recent email in the stack to be removed from the stack (of course, assuming that the new email satisfies any applicable rule governing whether it should be represented by a stack card at all).

Just as cards may be ordered in a stack according to a stacking policy rules 290, so too application stacks may be ordered according to stacking policy rules 290. The above discussion of rules for cards applies generally to rules for stacks. As an example, a user may order stacks according to his perceived likelihood of use. Thus, the user may place email and contact list stacks at the center (most accessible) of the plurality of stacks and photos and movies at the edges (least accessible) of the plurality of stacks.

How to create and implement stacking policy rules 290 will be understood by one of ordinary skill in the art in view of the description given herein.

Processor 220 uses a Desktop Presentation Application ("DPA") 292 to send the application stacks to display device 230 for display. Depending on the number and visual size of the application stacks and on the size of the display area of the display device 230, DPA 292 may display on display device 230 all or only some of the created application stacks. Also, DPA 292 may display partial (e.g. truncated) images rather than complete images of some or all of the created application stacks. DPA 292 may display the application stacks on display device 230 as three-dimensional entities extending (along a hypothetical z-axis) perpendicular to the surface of the display device, each application stack containing stack cards displayed as two-dimensional entities positioned successively in the stack along the z-axis depthwise (from foreground to background) into the display device 230. The display of the application stacks and stack cards will be clear from the subsequent discussion thereof with reference to FIGS. 3, 7A-C and 8A-C.

Application stack generator 240 is a component that may be implemented in software, firmware or hardware, or any combination of one or more of these elements. ASG 240 is used, in conjunction with processor 220, to create application stacks and stack cards, including the tasks of associating each application stack with a corresponding computer application and inserting stack cards in (or associating stack cards with) the corresponding application stack.

Application stack generator (ASG) 240 may be, include, or be based on the "WebKit" tool. In general, "WebKit" is an object-oriented design tool that, among other things, facilitates embedding web content in computer applications. Embedding web content in a computer application is done by creating objects known as "WebView objects", placing the WebView objects in a window, and sending a load request message to load the window with the embedded WebView objects. The WebKit tool allows doing complex things, such as customizing the user interface, using multiple windows, implementing other browser-like features, such as back and forward buttons, etc.

Alternatively, ASG 240 may be, include, or be based on a tool known as "Android", which is an Open Handset Alliance Project. More specifically, "Android" is a software platform for mobile devices that includes an operating system, display and input drivers, and an application framework providing—among other functionality—a set of graphical and event frameworks that can be used to implement embodiments disclosed herein.

Alternatively, ASG 240 may be, include, or be based on other suitable tools, as will be appreciated by one of ordinary skill in the art in view of the description given herein.

As for the creation of stack cards, a stack card template may be used in this task. That is, application stack generator 240 may generate, for a particular application stack, a stack card template (used to create all the stack cards for the application stack) that is functionally, and optionally visually, designed for the particular computer application associated with that application stack. Thus, each application stack/computer application may have stack cards visually tailored (unique) to it. Each stack card template may include a set of data fields whose contents are relevant to the pertinent computer application. Every time processor 220 determines (i.e., based on information held in database 280 and, if applicable, on Stacking Policy Rules (SPR) 290) that a content entity should be represented by a stack card, processor 220 instructs application stack generator 240 to use the pertinent stack card template to create a stack card for that content entity and to fill out the stack card's data fields using information that is contained in the corresponding entry in database 280. Filling out a stack card may be done using all or some of the information held in the corresponding entry in database 280, and additional information may be "inserted" into the stack card based, e.g., on a file of the content entity (e.g., information pertaining to the creation date and time of the file, modification date and time, file name, time of arrival/receipt, etc.).

It is to be understood from the discussion of ASG 240 that ASG 240 may be integrated into the computer applications (that is, applications 250, 260 and 270 (FIG. 2) or 312, 314 and 316 (FIG. 3)) or a separate component. For example, ASG 240 may be a series of class objects that are compiled into each computer application or a separate, shared library dynamically called from the computer applications, or may be a separate process invoked by a Remote Procedure Call (RPC) from the computer applications.

OS and Architecture of a Mobile Phone

Figure 3:
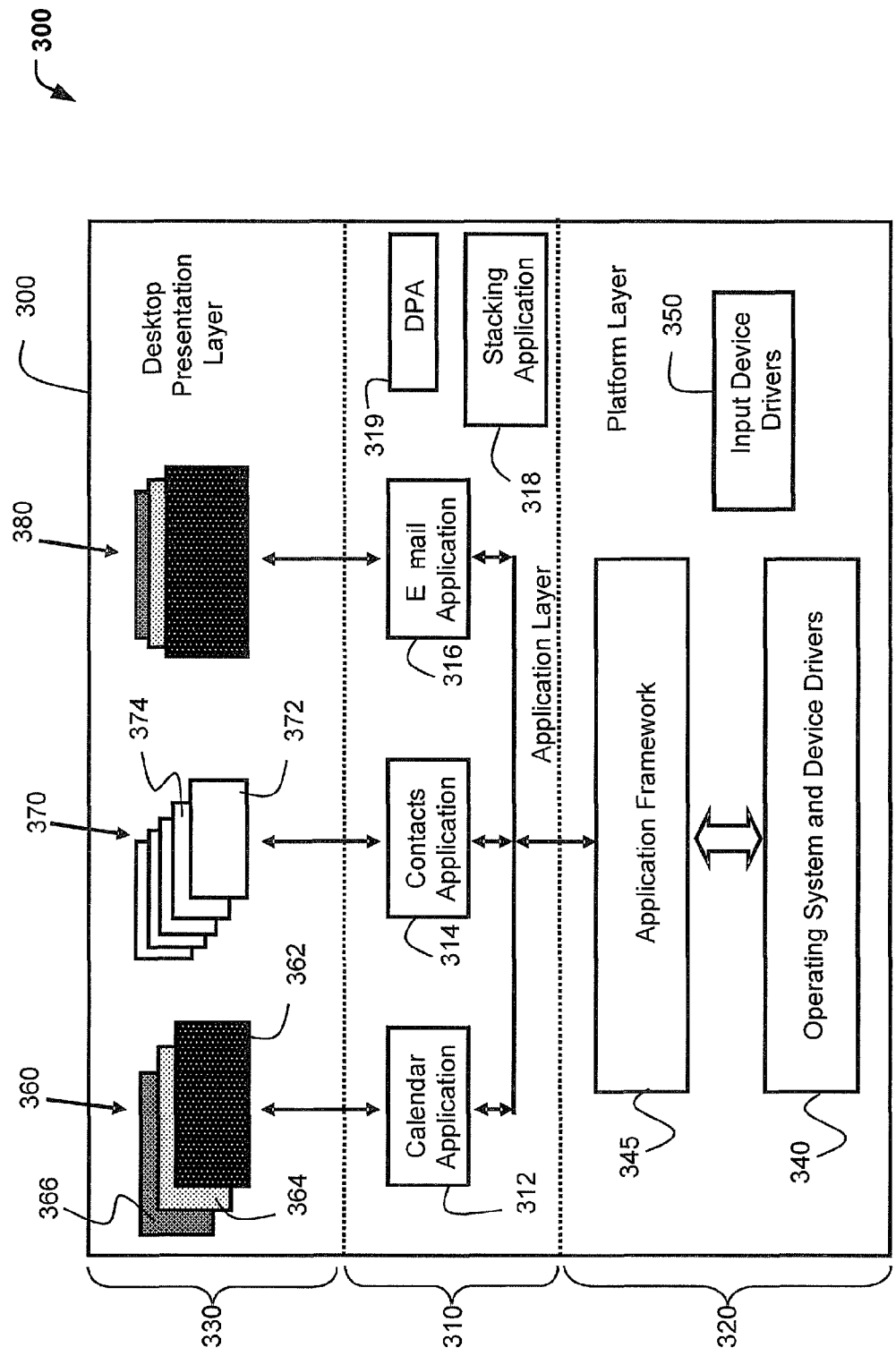
FIG. 3 schematically illustrates a mobile phone's architecture according to an example embodiment.

FIG. 3 schematically illustrates a mobile phone's architecture 300 according to an example embodiment. Mobile phone's architecture 300 includes an application layer 310, a Platform layer 320, and a Desktop Presentation Layer ("DPL") 330. Mobile phones generally operate using operating systems similar to operating systems of personal computers. For example, advanced mobile phones are designed to run various phone applications associated, for example, with dialing/calling numbers, handling voice communications, handling calls, log address book, calendar content, contact information, and e-mails, etc. Application layer 310 includes the computer applications running on the mobile phone which, by way of example, are a calendar application (shown as "Calendar Application" 312), a contact application (shown as "Contacts Application" 314), and an electronic mail application (shown as "E-mail Application" 316). Application layer 310 also includes a stacking application 318. A processor such as processor 220 of FIG. 2 may execute, in conjunction with application stack generator 240, as appropriate an application such as stacking application 318 to perform the steps, procedures and methods associated with the generation and operation of the application stacks described herein. Application layer 310 also includes a desktop presentation application (DPA; also referred to as a display application) 319 for operating in conjunction with Desktop Presentation Layer 330 to implement the static and dynamic aspects of the displaying of the application stacks described herein. It should be noted that DPL 330 is created by DPA 319, which draws data from the computer applications to create the stacks, and accordingly DPL 330 may not always be separated from the computer applications on a process level.

Platform layer 320 includes an Operating System (OS) and device drivers 340, an application framework 345, and input device drivers 350. Platform layer 320 may include additional drivers, such as a graphic adaptor driver (not shown), a Wi-Fi antenna driver (not shown), etc. Input device drivers 350, which may also be referred to as human interface device drivers, include drivers for any input device(s) used, such as a touch screen, mouse, keyboard, keypad, etc. Application framework 345 is a series of interfaces and functions provided by the platform in order to support computer applications running above the operating system. Briefly, a "driver" is a computer program allowing higher-level computer programs to interact with a hardware device. A driver typically communicates with the hardware device through the computer bus or communications subsystem to which the hardware device is connected. Drivers are hardware dependent and operating system specific. Exemplary operating systems that can reside in the platform layer include Linux, Microsoft Windows Mobile, Symbian, Microsoft Windows, and Mac OS. As will be appreciated by one of ordinary skill in the art in view of the description given herein, other suitable operating systems may also be employed.

Input devices (e.g. a touch screen driver, mouse, keypad, keyboard, etc.) and their drivers 350 allow the user of the device (e.g. a mobile phone) to perform various traditional operations of the mobile phone (e.g., dialing phone numbers, receiving and sending text messages, browsing through an email folder/application/list, etc.) by entering alphanumeric data or otherwise. Additionally, as will be described below, input device and their drivers 350 allow the user to scroll application stacks horizontally (i.e. move from stack to stack) and along the hypothetical z-axis (i.e. scroll through the stack cards of a given application stack) and to interact with application stacks and stack cards.

Stacking application 318 may use a standard interface defined by the OS to interact with input device drivers 350.

By way of example, Desktop Presentation Layer 330 presents for display by display device 230 three application stacks: application stack 360, which is associated with Calendar Application 312; application stack 370, which is associated with Contacts Application 314; and application stack 380, which is associated with E-mail Application 316. Each of application stacks 360, 370, and 380 includes stack cards that were created by processor 220 according to stacking policy rules 290 of FIG. 2. As explained above, each stack card uniquely represents one content entity that can be interacted with or used by a user through use of the relevant computer application. Referring to Calendar Application 312, stack cards 362, 364, and 366 may represent content entities such as calendar entries indicating time-dependent tasks that the user is required to timely attend to. For example, stack card 362 may represent a calendar entry that reminds the user to participate in a meeting at a specified date/time; stack card 364 may represent a calendar entry that reminds the user to pay a bill; stack card 366 may represent a calendar entry that reminds the user to book tickets to a concert, etc. Referring to Contacts Application 314, stack cards 372, 374, etc. may each represent a contact (each contact containing contact information) in a phone directory of the user. For example, stack card 372 may represent a contact that contains contact information of person "X"; stack card 374 may represent a contact that contains contact information of a particular customer, etc. As shown at the upper portion of FIG. 3, as noted above, and as described farther below, the application stacks may be displayed on display device 230 as three-dimensional entities extending (along a hypothetical z-axis) perpendicular to the surface of the display device, each application stack containing stack cards displayed as two-dimensional entities positioned successively in the stack along the z-axis depthwise (from foreground to background) into the display device 230.

Stacking application 318 may be an OS-compatible application that provides a user interface for a user using OS-based user interface API's. The OS may be, for example, Android, and the OS-compatible application may be implemented in any compatible programming language (such as Java) by using any compatible framework (e.g., Android's application framework, OpenGL ES, or WebKit). Alternatively, the OS may be, for example, Windows Mobile, and the OS-compatible application may be implemented using the C++ language, using the native API provided within Windows Mobile. Alternatively, other suitable operating systems, programming languages and frameworks/APIs may be employed.

A user may communicate with the mobile phone using a Human Interface Device ("HID") (or input device, as discussed above) or any other suitable transport layer. Briefly, "HID" is a type of computer device that interacts directly with, and takes input from humans (e.g., from a keyboard, touch screen, a computer mouse, etc.) and may deliver output to output devices (e.g., to display devices).

Figure 4:
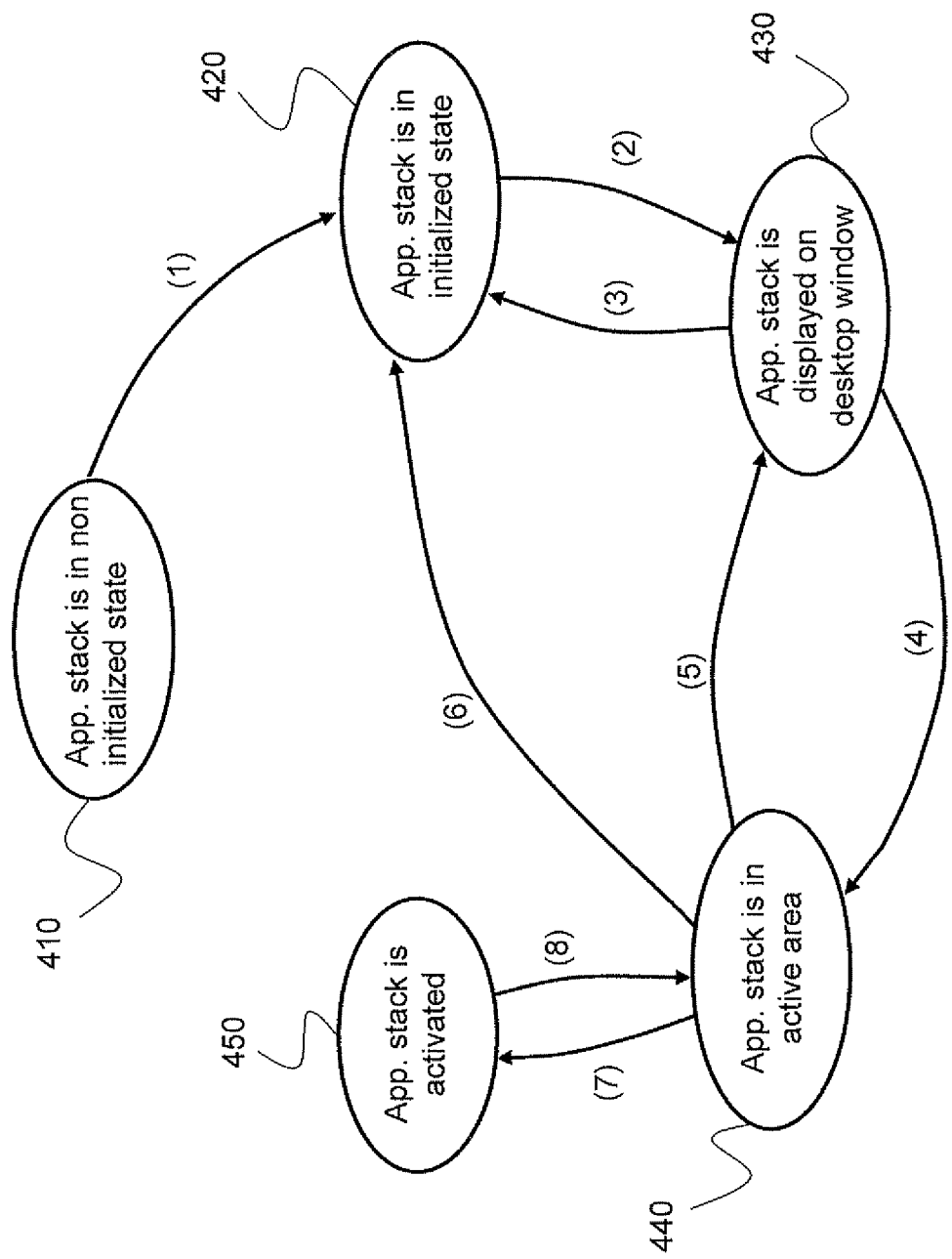
FIG. 4 illustrates a state machine showing states of an application stack and transitions therebetween, according to an example embodiment.

FIG. 4 is a state machine for a single application stack according to an example embodiment. In general, a stack may be in one of the following states: (1) "non-initialized," in which state the object that represents the stack has been allocated but not initialized or registered with the DPL 330; (2) "Initialized", in which the application stack has been initialized and registered but is not displayed to the user; (3) "Displayed", in which the application stack is (wholly or partly) displayed to the user but can not be interacted with by the user; (4) "Centered" or "active", in which the application stack is displayed in the "active area" (which may be a center area) of the display area of display device 230 and can be interacted with by a user; and (5) "activated," in which a stack card of the stack has been selected by a user and is being/has been operated on by the associated computer application. If the stack is in state (3) or in state (4) and moved completely out of the display area, the application stack returns to the initialized state (i.e., to state (2)). If the application stack is in the Centered state (i.e., it is in state (4)) and moved (e.g., horizontally relative to the display area) out of the active area or decentered, but not completely out of the display area, the application stack returns to the Displayed state (i.e., to state (3)) and can not be interacted with. More specifically, an application stack may transition between several states as described below.

In state 410, the application stack is not initialized. In this state the application stack has been created but has not been initialized or registered with the DPL 330 and hence is not displayed. Transition (1) to state 420 occurs when the desktop loads the application stack and invokes the pertinent application(s). At the conclusion of transition (1) the application stack is initialized, which means that creation of the application stack is complete but the stack is still not yet displayed. While in state 420, the application stack may interact with the associated computer application(s), for example, to delete a stack card (e.g. if the corresponding content entity ceases to satisfy the pertinent stacking policy rule), to add a new stack card and to dynamically update the content contained in each stack card, etc.

Transition (2) to state 430 occurs when the application stack is displayed (wholly or partly), generally as a result of a user sliding, or scrolling, other application stacks across the viewable area (i.e., across the desktop window) of the display screen. All of the application stacks are concatenated such that scrolling or dragging any one drags all the others in tow. Sliding, or scrolling, an application stack from an undisplayed state or position to a displayed state or position involves drawing the application stack on the screen and refreshing any bitmaps of dragged stack cards images that need to be refreshed. If an application stack is dragged out of the viewable area of the display screen, transition (3) is invoked, and the application stack reverts to state 420.

Transition (4) to state 440 occurs when the user drags the application stack to the active area of the desktop window, which may be, for example, a center area of the desktop window. While in state 440, the application stack can be interacted with, e.g., a content entity represented by a stack card of the application stack can be operated on by selecting the corresponding stack card, as described herein, for example, below in the discussion of FIGS. 6, 7A-C and 8A-C. While an application stack can be interacted with, a number of application stacks to either side thereof may be in the display state (i.e., in state 430), in which they are displayed (in whole or part) but cannot to be interacted with. It should be noted that one or more application stacks may be interacted with at any given time, as long as the one or more application stacks are displayed in the active area. (Whenever multiple stacks are located in the active area simultaneously, all the stacks located in the active area are active, i.e., can be interacted with.) While in state 440, one or more ancillary applications associated with the application stack may react to transition (4) by loading background processes or otherwise preparing for a user interaction with the application stack. If the application stack is dragged out of the display device's active area (thus causing another application stack to replace it in the active area) but not off the display screen altogether, transition (5) is invoked and the application stack reverts to state 430, in which it is viewable but not interactable. If the application stack is moved completely out of the display area, transition (6) is invoked, and the application stack reverts to state 420, in which it is not displayed.

Transition (7) to state 450 occurs when the stack card at the front (most in the foreground) of the application stack is selected by the user, for example, by being pressed (i.e. touched via the touch screen) or clicked on by the user. In state 450, the application stack is "activated": the computer application associated with the application stack is launched and operates on the content entity represented by the selected stack card (e.g to display the stack card or perform another operation on it). The launched computer application, or a background process associated with the launched computer application, may transition (8) the application stack from state 450 to state 440 when the launched computer application is closed or when the operation performed on the content entity is completed, in which case the desktop reverts to displaying the same application stack. In state 450, depending on the operation performed, the entire application stack may not be displayed on the display screen. Alternatively, transition (8) (i.e., closing a launched computer application and reverting to displaying the same application stack) may be done under the control of or performed by, the involved desktop application (e.g., under Desktop Presentation Application 292 of FIG. 2, or Desktop Presentation Application (display application) 319 of FIG. 3).

In addition to displaying a content entity, other operations that could be performed on a content entity in state 450 include, e.g. dialing a phone number of a contact entry, replying to a text message or e-mail message, playing/rendering (e.g. video or audio), etc. Other operations that could be performed here (although not necessarily strictly speaking operations on a given content entity) include transitioning to a different operating mode of the device (such as silent, locked, or power off.)

Figure 5A:
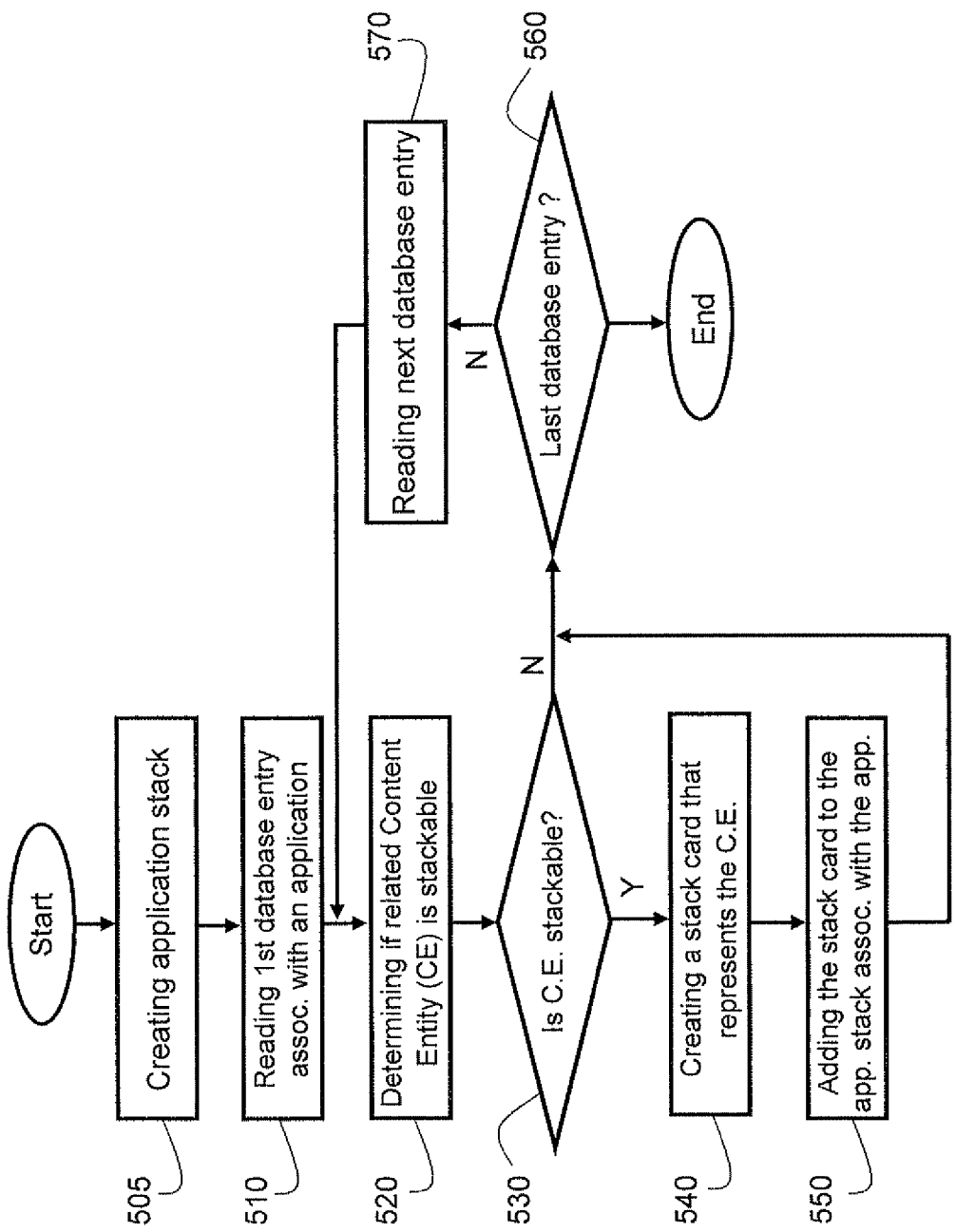
FIG. 5A is a flow chart illustrating a method for generating an application stack according to an example embodiment.

FIG. 5A is a method for generating an application stack according to an example embodiment. FIG. 5A will be described in association with FIGS. 2 and 4. As explained above, a separate application stack is uniquely created for each computer application that is stored in storage device 210. In order to create an application stack for a particular computer application, processor 220, together with application stack generator 240, allocates an object that represents the stack, initializes the object and registers the stack with the Desktop Presentation Layer 330. A stack is an 'object' (in the sense of object oriented programming) that includes data structures needed to populate (provide content to) stack cards (such as the database location from which to extract card metadata) and the graphical parameters that define the stack's look and 'feel' (as an object that can be interacted with by a user) on the display. The graphical parameters may include 'theme' data (e.g. the shapes and color schemes of the cards, etc.) as well as the positioning of the stack on the desktop window (display area). The association of the stack with the corresponding computer application is typically done during the initialization phase. In that regard, one of the parameters of the allocated object would be the name or other logical ID of the computer application in question. For example, in Android, this is done by recording the intent that would be invoked when the stack is 'touched' by a user. In Windows Mobile this may be done by recording the class ID of a COM object that would be invoked when the stack is touched. It will be understood by one of ordinary skill in the art in view of the description herein how this is done on other platforms. This creation of the application stack (allocation, initialization, and registration, including association with the corresponding computer application) is performed in step 505 on the flow chart in FIG. 5A.

After creation of the application stack, processor 220, again in conjunction with application stack generator 240, creates the stack cards for the stack and inserts them in the stack. To create the stack cards, first database 280 is scanned in order to find entries that are content entities of the particular computer application. Assuming that processor 220 finds such entries and retrieves the information stored in them, processor 220 has to check which of the content entries related to the entries comply with the stacking policy rules 290, if applicable. As explained above, stack cards may be created for all content entities associated with the pertinent computer application, or stack cards may be created selectively, with a stack card being created for a content entity only if the content entity complies with the applicable stacking policy rules 290.

Accordingly, at step 510, processor 220 reads the information held in the first entry of database 280. At step 520, processor 220 determines (i.e., based on the read information and on the stacking policy rules) whether the related content entity is stackable or not. If, at step 530, processor 220 determines that the content entity related to the read information is stackable (shown as "Y" at step 530), processor 220, in conjunction with ASG 240, creates, at step 540, a stack card that represents the related content entity and, at step 550, processor 220 logically adds the stack card to the application stack. Creating the stack card may be performed using a stack card template as described above. "Logically adding a stack card to an application stack" means associating the stack card with the pertinent computer application and, if the application stack is in state 430 or in state 440 (see FIG. 4), then the stack card is displayed in proximity to the other stack cards associated with the same computer application (i.e. is displayed in the corresponding stack), for example, as shown in FIG. 3, at 360, 370, and 380. Put another way, a stack card is inserted into the corresponding stack by calling a member function of the allocated stack object, which adds the stack card object into a list/array of cards maintained by the stack object. Then, when the stack object is called upon to render (display) itself on the screen by the DPL 330, it would enumerate the stack cards that are in the list or array and the stack cards would be displayed on the screen.

At step 560, processor 220 checks whether the read database entry is the last entry. Assuming the read database entry is not the last entry (shown as "N" at step 560), processor 220 reads, at step 570, the next database entry and, at step 520, it determines from the information contained in the database entry and the stacking policy rules 2990 whether the content entity pertaining to that information is stackable. (If the content entity is not stackable, or the content entity is stackable and processor 220 created for it a stack card (at step 540), processor 220 checks again, at step 560, whether there are more database entries from which to read information.) If the database entry which was read last is the last entry of database 280 (shown as "Y" at step 560), this means that processor 220 has completed the creation of the application stack for the particular computer application. At this point, the application stack is completed, i.e. populated with all of its stack cards. Of course, content entities may be added or deleted, and may begin or cease to satisfy stacking policy rules 290, so that this state of completion of a stack is a temporary state. When such changes occur with respect to content entities, the application stack may be updated by the processor 220.

While FIG. 5A assumes that stacking policy rules 290 are in place for selectively creating stack cards from content entities, as explained above it is not necessary that such rules 290 be employed in this context.

Figure 5B:
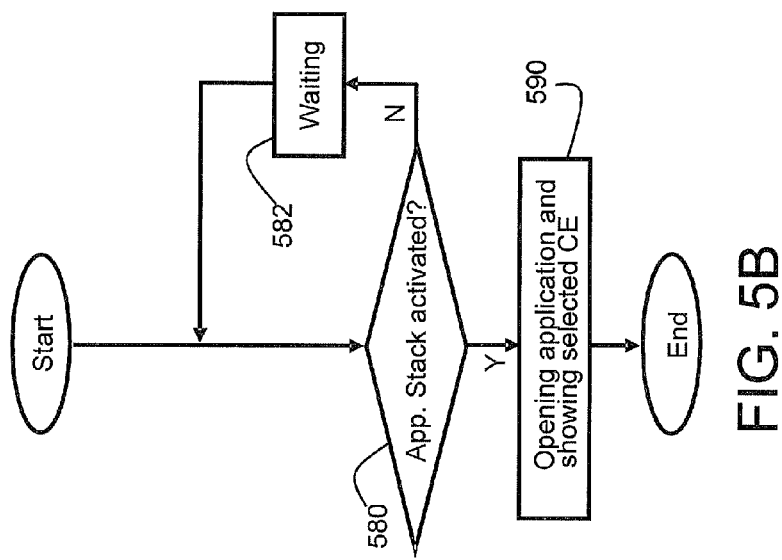
FIG. 5B is a flow chart illustrating a method for using a user interface according to an example embodiment.

FIG. 5B is a flow chart illustrating a method for using a user interface according to an example embodiment. At step 580, processor 220 checks whether the application stack has been activated by the user (state 450, FIG. 4). If the application stack has not been activated by the user (shown as "N" at step 580), processor 220 waits (step 582) until it is activated by the user. If the application stack has been activated by the user (shown as "Y" at step 580), processor 220 opens, at step 590, the particular computer application and performs the operation selected by the user on the content entity. Examples of operations performed on content entities have been discussed above with reference to FIG. 4 and include displaying the content entity (e.g., a contact entry, etc.), dialing a phone number (e.g. included in a contact entry), replying to a text message or e-mail message, playing/rendering (e.g. video or audio), etc. At this stage, the application stack is in the activation state 450 shown in FIG. 4.

Figure 6:
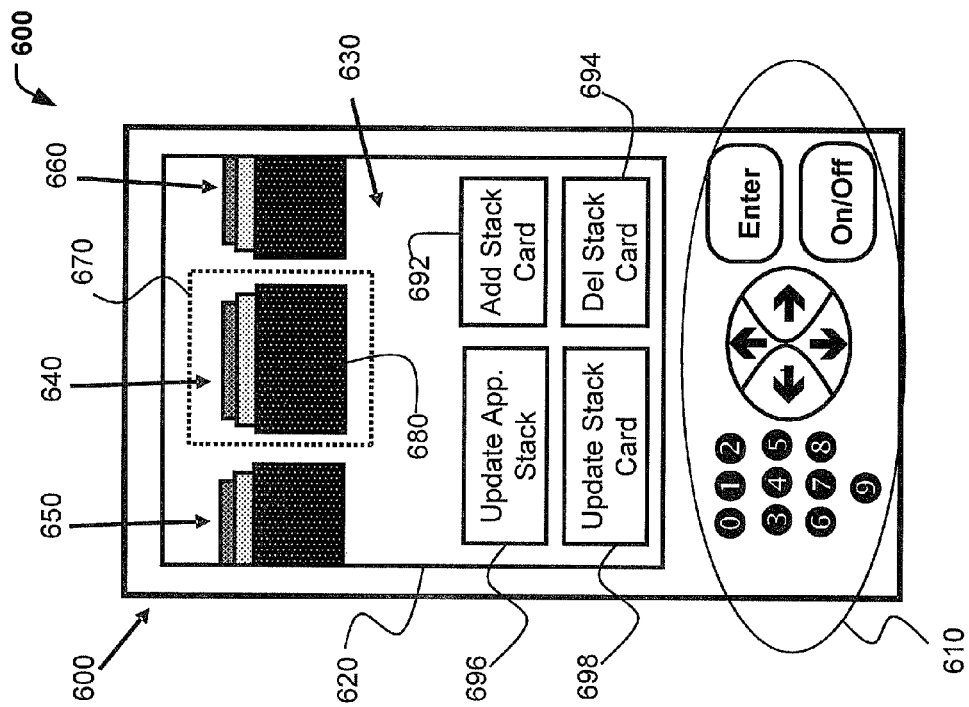
FIG. 6 illustrates a user interface according to an example embodiment.

FIG. 6 schematically illustrates a computer device 600 according to an example embodiment. Computer device 600 includes a user input device 610 and a display device 620. As shown in the figure, user input device 610 includes a keypad (number pad), arrow buttons, and other function buttons. In practice, user input device 610 may include any of a wide range of suitable types of user input devices, including keyboards, mice, etc., as would be appreciated by one of ordinary skill in the art. A user of computer device 600 may use user input device 610, for example, to select a stack card, scroll stack cards in an application stack, drag application stacks, update stacking policy rules (e.g., delete and/or add stacking policy rules), etc. Display device 620 has a display area or desktop window 630. By way of example, desktop window 630 displays an application stack 640 in its entirety, and displays portions of application stacks 650 and 660. Each of application stacks 640, 650, and 660 is associated with a different computer application. It is to be understood that display device 620 and user input device 610 may be instantiated as a device (or multiple devices) separate from computer device 630. A combination of display device 620 and user input device 610 may be referred to as a user interface, user interface apparatus or the like.

As explained above, an application stack can be interacted with if it is located within a predefined area, referred to as an "active area" or an "interaction area," within the display area or desktop window. In reference to FIG. 6, this area is designated by reference numeral 670 and is shown as being bounded by a dotted line. While interaction area (or active area) 670 is shown in the figure as being located at a central region of the display area or desktop window 630, interaction area 670 need not be located in this region but could be located at any region of desktop window 630. Interaction area 670 could be indicated by markings or the like on the desktop window 630, by highlighting, etc. As shown in FIG. 6, application stack 640 is located in interaction area 670 of desktop window 630. Therefore, application stack 640 can be interacted with by using a touch screen (not shown) of display device 620 (i.e., if display device 620 includes a touch screen), or by using user input device 610 (as mentioned, other types of user input device may be employed in computer device 600 or other device employed in place of computer device 600).

The interaction with application stack 640 may include interacting with application stack 640 as an application stack, or interacting with stack cards of application stack 640. Interacting with a stack card may involve pressing (e.g. touching via a touch screen) or clicking on a stack card of application stack 640, or 'vertically' scrolling stack card within the stack 640, or even out of the viewable area. It is noted that stack card 680 is the front card (the card most in the foreground) of stack 640. Pressing or clicking front stack card 680 invokes (causes execution of) the computer application associated with application stack 640 and causes the computer application to operate on stack card 680. The particular operation performed on card 680 could be displaying the content entity represented by card 680 or a different operation, e.g. dialing the phone number of the contact if the content entity were a contact entry of a phone contacts list. Displaying the content entity could be performed, e.g., by clicking on the card in general, while dialing the phone number could be performed by clicking specifically on the image of the phone number in the content entity, or the like. In general, different actions (inputs) may be performed by the user to effect different operations on the stack card. The range of such different actions and their implementation will be appreciated by one of ordinary skill in the art. Computer device 600 may be programmed so that a specific default operation (e.g., displaying or opening the content entity) is performed on the selected stack card in the absence of the user's performing a special type of selection action.

The computer device 600 may be programmed such that any card in the active stack (i.e. the stack in the active area 670) may be selected as described above. Alternatively, the computer device 600 may be programmed so that only the front card (here, 680) may be selected as described above. In that case, the computer device 600 may be programmed so that pressing or clicking a card other than the front card causes that card to move to become the front card. In this case, the computer device 600 may be programmed so that the card other than the front card is moved to become the front card without causing any change in position of the other cards in the stack, except to move them all back one card. Alternatively, the cards in the stack may behave as if concatenated in series, so that moving any card in the stack causes all the other cards to move in turn, i.e. drags all the other cards along with it, i.e. moving a card forward in the stack would drag all the cards forward, and moving a card backward in the stack would drag all the cards backward.

The computer device 600 may be programmed so that pressing or clicking a card other than the front card does not cause that card to move to become the front card, but rather so that cards may be moved only as in a concatenated series, by dragging or scrolling all the cards in a stack together. In this case, the dragging or scrolling of a single card may effect the dragging or scrolling of the all the rest of the cards in the stack in tow.

The scrolling or dragging of stack cards, by means of 'gestures' (finger actions on the touch screen) is described below with reference to FIGS. 7A-7C. The up and down arrows of user input device 610 may be programmed in any of a variety of ways so as to be usable to drag or move cards forward or backward in a stack In the course of the movement of cards in a stack, it may occur that one or more cards are dragged out of the display area altogether. For example, the computer device 600 may be programmed so that dragging the front card forward drags it off the display screen (in the forward direction) to become no longer displayed. Likewise, since the display area is of a finite size, when the display area is filled up in the vertical direction (i.e. in the depth direction as seen by the user) with stack cards, moving a stack card backwards will drag it off the display (in the backwards direction) to become no longer displayed. Moving a card off the display area in the forward or backward direction frees up space for an undisplayed stack card to be added to the back or front end of the stack, respectively. The computer device 600 may or may not be programmed to display an additional card in the freed up space in these situations. It is understood that the number of cards created or slated for creation for a stack may often exceed the number of cards that can be accommodated in the stack in view of the size limits of the display screen. Such excess cards may or may not be maintained when not displayed. E.g., to conserve memory resources, the number of undisplayed cards maintained may be limited. Cards not maintained may be recreated as necessary to fill in freed up space.

When cards are added to a stack to fill freed up space, the computer device 600 may be programmed so that the added cards are added to the appropriate position in the stack according to the ordering principle in effect for the stack. For example, if the cards of a given stack are ordered according to recentness of use of the corresponding content entities, the added card would be inserted into the appropriate place in the stack so that cards ahead of it were used more recently and cards behind it were used less recently Relatedly, the computer device may be programmed to automatically update the ordering of cards in a stack to conform with the principle of ordering in effect for the stack. E.g., in a stack ordered according to recentness of use, the use of a given content entity would cause the card representing that content entity (whether currently displayed or not) to be moved to the front of the stack.

How the application stacks and stack cards are displayed and manipulated (moved, selected, etc.) on the display area or desktop window 630 is controlled by the desktop presentation application (display application) 319 and carried out by the processor 220.

Other ways of interacting with an application stack in the active area or with the stack cards thereof pertain to updating of the application stack or the stack cards. For example, the user may manually add a stack card to an application stack by pressing a button such as "Add Stack Card" 692; or delete a stack card by pressing a button such as "Del Stack Card" 694; or update an application stack by pressing a button such as "Update App. Stack" 696; or update a stack card by pressing a button such as "Update Stack Card" 698. Pressing the indicated buttons would call appropriate interactive routines whereby the user could carry out his intention on the proper items. Of course, other user input devices could be used instead of or in addition to buttons such as 692, 694, 696 and 698. Additionally or alternatively, computer device 600 may update application stacks and stack cards dynamically and automatically as existing content entities are deleted (or begin or cease to satisfy stacking policy rules) and new content entities are added.

Figure 7C:
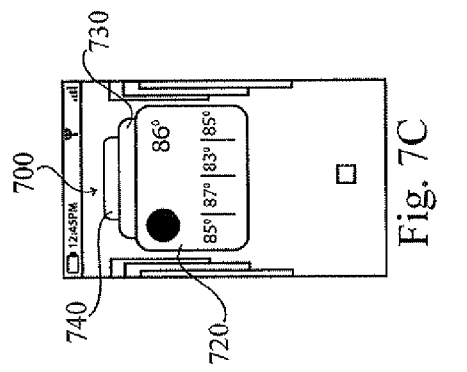
FIGS. 7A through 7C demonstrate vertical scrolling of stack cards according to an example embodiment.
Figure 7B:
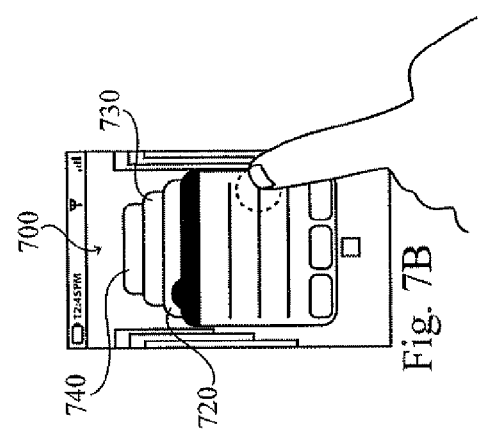
Figure 7A:
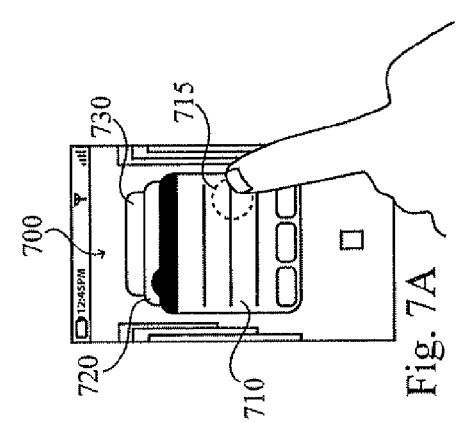

FIGS. 7A and 7B demonstrate vertical scrolling of stack cards according to an example embodiment. (Although not labeled in the figures, the active area is considered to be a central area of the display area, similarly to the illustration shown in FIG. 6. Thus, application stack 700 is in the active area and hence may be interacted with.) With reference to FIG. 7A, stack card 710 is currently at the front of the application stack 700. Behind stack card 710 are stack cards 720 and 730. The user of the computer device vertically may scroll 715 (the image of) stack card 710 downwards such that stack card 710 is moved off the viewable area, (no longer displayed), and stack cards 720 and 730 are advanced accordingly, the result of which is seen in FIG. 7B, where stack card 720 is shown at the front of application stack 700. In addition, new stack card 740 has been automatically added to the back of application stack 700, as seen in FIG. 7B. In this regard, the scrolling 715 of card 710 (which automatically scrolls all the cards in the stack 700) may be carried out by a finger motion on the touch screen, namely, of dragging the finger downward in the direction of the arrows (labeled "drag") as shown in FIGS. 7A and 7B. It should be noted that the arrows labeled "drag" are provided for purposes of explication of this embodiment and do not necessarily appear on the actual display screen. As seen in FIGS. 7A and 7B, a variety of operations may be performed on the content entity represented by the front card. For example, the content entity represented by the front card may be opened in inbox, friends, or profile view, by pressing on the corresponding box on the touch screen.

FIG. 7C illustrates a different type of stack card (i.e. a stack card representing a different kind of content entity) than that shown in FIGS. 7A and 7B. This illustrates the fact that different application stacks (corresponding to different computer applications) can have different kinds of stack cards (based on different stack card templates, as discussed above), suitable to the nature of the content entities being represented and the nature of the corresponding computer applications. Here, whereas the contact entry shown in FIGS. 7A and 7B has various operations that can be performed on it (e.g. open it in a specific view), such operations have no application to a weather report content entity and hence are not included in such stack cards.

Figure 8C:
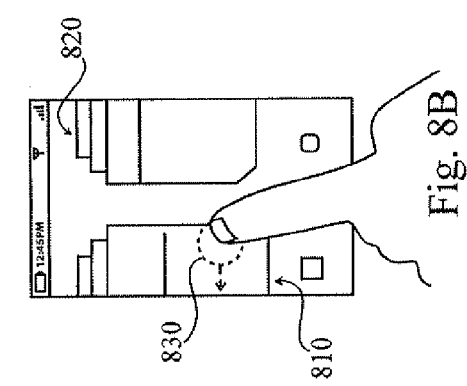
FIGS. 8A through 8C demonstrate horizontal scrolling of application stacks according to an example embodiment.
Figure 8B:
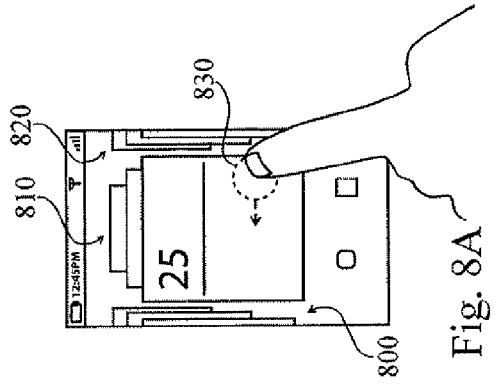
Figure 8A:
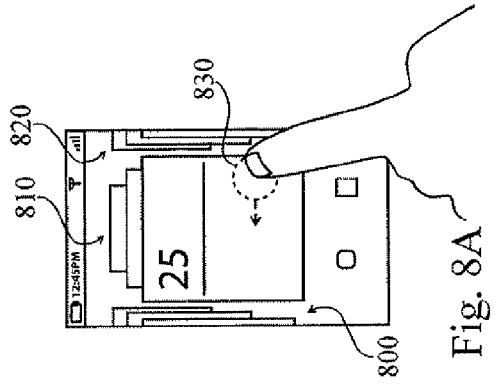

FIGS. 8A through 8C illustrate interactions with application stacks by use of a user's finger, in particular, dragging or scrolling of application stacks, according to an example embodiment. With reference to FIG. 8A, application stack 810 is currently centered within the interaction area of the desktop window, which makes that stack active, i.e. capable of being interacted with by a user. Portions of application stacks 800 and 820 are shown on the left and right sides of application stack 810.

The user may vertically scroll 830 (the image of) application stack 810, e.g. horizontally (leftwards or rightwards) such that application stack 810 is moved out of the interaction area, and potentially completely out of the display area. With reference to FIG. 8B, stack card 810 is shown in an intermediate state in which it can no longer be interacted with and stack card 820 cannot be interacted with yet, i.e. the one has been moved out of the active area and the other has not yet been moved into it. (Although not labeled in the figure, the active area is considered to be a central area of the display area, similarly to the illustration shown in FIG. 6.) While application stack 810 is scrolled 830 to the left hand side of the viewable area, application stack 820 is dragged in tow towards the interaction area. In FIG. 8C, stack card 820 has been centered within the interaction area, which makes it capable of being interacted with. As with FIGS. 7A and 7B, the scrolling 830 of application stack 810 (which automatically scrolls all the stacks, of which only two, 800 and 820, are shown) may be carried out by a finger motion on the touch screen, namely, of dragging the finger horizontally in the direction of the arrows (labeled "drag") as shown in FIGS. 8A and 8B. It should be noted that the arrows labeled "drag" are provided for purposes of explication of this embodiment and do not necessarily appear on the actual display screen. As discussed above, the stacks may be ordered according to a stacking policy rule 290 e.g. expressing a user preference. Thus, the user may drag the stacks in one direction or the other in order to reach a certain stack, depending on the nature of the ordering of the stacks. As with stack cards, alternate means of moving stacks may be provided. For example, it could be arranged that pressing or clicking on a stack could move it to one end of the sequence of stacks (and hence in the illustrated case) off the display screen.

Of course, the fact that application stacks are described herein as being moved horizontally while cards are described herein as being moved 'vertically' (depthwise), while believed to be intuitive and user-friendly in the illustrated cases, nonetheless not necessary, and alternate dynamic configurations could be implemented. Such movements need not be limited to the x, y and z directions, but could be, e.g., in diagonal or other directions.

While in the above description it has frequently been assumed that only a single stack is active (and located in the active area) at a time, this need not be the case. More than one stack may be located in the active area and be active (capable of being interacted with) at a time. The active area may be made sufficiently large to accommodate multiple stacks. Whenever multiple stacks are located in the active area simultaneously, all the stacks located in the active area are active.

While the figures generally show all the stacks, whether active or not, to be the same size and hence equally visible (bracketing the fact that stacks may be partly cut off due to the size limits of the display area), this need not be the case. For example, it could be arranged so that only active stacks are made large or easily visible/legible to the user, while other stacks are shown with less resolution, etc. or not shown at all, e.g. to conserve memory resources. Similar measures could be taken with stack cards. While it will often be desirable to show more than one card in a stack at a time, it may be desirable to show fewer cards, or fewer cards at full visibility, than space permits, in order to conserve memory resources. In such case, the visibility of a card (or stack) could be made to increase upon dragging the card (or stack) closer to the foreground (or active area).

As note above, while the description herein has generally referred to application stacks and stack cards, this terminology, and the accompanying figures, are not to be taken as limiting in any way the configuration, format, etc. (e.g. size, shape, design, etc.) of the application stacks and stack cards that may be employed herein, displayed or otherwise presented to a user. For example, as might suit a display device of the size of a personal computer monitor or larger, application stacks and stack cards could be displayed in two rather than three dimensions, e.g. each stack being a vertical axis (i.e. appearing to the user as vertical, not as a z-axis) having two dimensional cards (as illustrated herein) strung along it vertically, with the card at the top or bottom deemed the first in the stack. Again, as stated above, while the terms "application stack" and "stack card" are used to refer to specific embodiments disclosed herein and to facilitate understanding of the ideas and implementations presented in this disclosure, it is to be understood that this disclosure could also be presented or written in terms of "groups" and "data objects" in the generic, lay or non-technical senses of those terms (instead of "application stacks" and "stack cards," respectively). As will be clear from context and from the knowledge of one of ordinary skill to the art as applied to this disclosure, the terminology used herein is to be understood in its ordinary or plain meanings but also to admit of such broader application. As another example, then, an application stack could be visually depicted as a cloud-like formation. Stack cards could be any-shaped objects within such stacks.

The ordering of cards or stacks need not be carried out in a linear fashion as described herein. For example, they could be ordered according to an artificially defined hierarchy of colors, with different stacks or cards being displayed in different colors.

The representation of content entities by stack cards need not be as representational as described herein. The content of stack cards could merely symbolically represent content entities as, for example, phone numbers may be represented by numbers or colors in a speed dial directory of a telephone.

The term "display" and related terms are not to be taken as being limited to visual representation. *Mutatis mutandis*, non-visual adaptations of the systems disclosed herein may be created based on the description given herein in view of the knowledge of one of ordinary skill in the art. For example, stacks and stack cards could be presented to blind users via Braille. Stack card contents, etc. could be displayed in Braille (much as alphanumeric characters are displayed by an LED) on a presentation medium that need not be visual but could be effectively sensible only to touch. Again, application stacks and stack cards could be presented as audio contents, with the user issuing voice commands (e.g. "forward," "backward," "up," "down," "next," "previous," "left," "right," "select," "display," "open," "play," "dial," etc.) to move among (scroll, drag) cards in a stack or among stacks, to select cards and to perform operations on the corresponding content entities; and the device could present the locations of cards and stacks, status thereof, etc. to a user by issuing audible information such as synthesized speech. Such audio features might be adopted for applications for use in motor vehicles, where the user (e.g. a driver) must generally watch his environment and is able to look at the display screen only occasionally or not at all, or for applications for use in other contexts having constraints on use of vision.

In view of the above description, the following aspects of the example embodiments described herein are noted.

According to a first aspect, there is provided a user interface apparatus including a display device, a display application, and a processor. The display device includes a display area, and the display area includes an active area. The processor and the display application are jointly configured to display on the display area any of a plurality of application stacks, each of the application stacks being movable into and out of the active area in response to user input, and each of the application stacks containing one or more stack cards. Each of the application stacks is associated with a respective corresponding computer application, and each of the stack cards represents a respective corresponding content entity capable of being operated on by the computer application corresponding to the application stack containing the stack card representing the content entity. When any given one of the application stacks is in the active area the given application stack is activated such that the one or more stack cards contained in the given application stack are displayed in a stack card sequence and at least one of the stack cards contained in the given application stack may be selected, the selecting of a stack card causing the respective computer application corresponding to the given application stack to be executed and to operate on the content entity represented by the selected stack card. According to this aspect, one or more of the application stacks may be in the active area (and hence activated) simultaneously.

According to a second aspect, the stack card sequence is a background-to-foreground sequence.

According to a third aspect, only the stack card furthest in a foreground of the background-to-foreground sequence of the given application stack in the active area may be selected.

According to a fourth aspect, the stack cards in the stack card sequence are ordered according to a rule.

According to a fifth aspect, a position of any of the stack cards in the stack card sequence of the given application stack in the active area may be changed by scrolling the given stack card in the stack card sequence.

According to a sixth aspect, any of the stack cards in the stack card sequence of the given application stack in the active area may be removed from the sequence so as no longer to be displayed on the display area, by scrolling the one or more stack cards in the stack card sequence.

According to a seventh aspect, the application stacks are displayable in an application stack sequence ordered according to a rule, and one or more of the application stacks are displayed in the display area simultaneously.

According to an eighth aspect, each of the content entities satisfies a rule, and the processor and the display application are jointly operable to update the display of the application stacks by (1) adding to one of the application stacks a given stack card representing a given content entity, if the given content entity satisfies a rule, and (2) removing from one of the application stacks a given stack card representing a given content entity, if the given content entity ceases to satisfy a rule.

According to a ninth aspect, each of the stack cards is a modified version of the content entity represented by the stack card.

According to a tenth aspect, the apparatus further includes a touch-sensitive screen for input of user input, and the at least one stack card contained in the given application stack in the active area may be selected by user input.

According to an eleventh aspect, there is provided a computer device including the user interface apparatus of the first aspect, an application stack generator, and a storage interface. The storage interface is for interfacing with the computer applications and the content entities when the computer applications and the content entities are stored in a storage. The processor and the application stack generator are jointly operable to create the plurality of application stacks and to associate the application stacks with the corresponding computer applications, respectively.

According to a twelfth aspect, in the computer device of the eleventh aspect, the processor and the application stack generator create a stack card for a content entity if the content entity satisfies a rule.

As will be understood from the description herein, any combinations of the above twelve aspects are possible, expect where implicitly or otherwise indicated to the contrary.

According to a thirteenth aspect, there is provided a method of facilitating interaction with content on a display device having a display area. The method includes providing an active area in a display area of a display device; displaying on the display area of the display device any of a plurality of application stacks, each of the application stacks being movable into and out of the active area in response to user input, each of the application stacks containing one or more stack cards, each of the application stacks being associated with a respective corresponding computer application, and each of the stack cards representing a respective corresponding content entity capable of being operated on by the computer application corresponding to the application stack containing the stack card representing the content entity, and activating all of the application stacks displayed in the active area such that for each of the application stacks displayed in the active area: the one or more stack cards contained in the respective application stack are displayed in a stack card sequence and at least one of the stack cards contained in the respective application stack may be selected, the selecting of a stack card causing the respective computer application corresponding to the respective application stack to be executed and to operate on the content entity represented by the selected stack card. According to this aspect, one or more of the application stacks may be displayed in the active area (and hence activated) simultaneously.

According to a fourteenth aspect, the stack card sequence is a background-to-foreground sequence.

According to a fifteenth aspect, only the stack card furthest in a foreground of the background-to-foreground sequence of the respective application stack in the active area may be selected.

According to a sixteenth aspect, the stack cards displayed in the stack card sequence are ordered according to a rule.

According to a seventeenth aspect, the method further includes changing a displayed position of a given stack card in the stack card sequence of the respective application stack in the active area in accordance with a scrolling of the given stack card by a user.

According to an eighteenth aspect, the method further includes ceasing to display on the display area a given stack card in the stack card sequence of the respective application stack in the active area in accordance with a scrolling of the given stack card by a user.

According to a nineteenth aspect, the method further includes causing the application stacks to be displayed in the display area in an application stack sequence ordered according to a rule, wherein one or more of the application stacks are displayed in the display area simultaneously.

According to a twentieth aspect, each of the content entities satisfies a rule, and the method further includes updating the display of the application stacks by (1) adding to one of the application stacks a given stack card representing a given content entity, if the given content entity satisfies a rule, and (2) removing from one of the application stacks a given stack card representing a given content entity, if the given content entity ceases to satisfy a rule.

According to a twenty-first aspect, each of the stack cards is a modified version of the content entity represented by the stack card.

According to a twenty-second aspect, the method further includes receiving user input via a touch-sensitive screen associated with the display device, and the at least one stack card contained in the respective application stack in the active area may be selected by user input.

According to a twenty-third aspect, the method further includes creating the plurality of application stacks and associating the application stacks with the corresponding computer applications, respectively.

As will be understood from the description herein, any combinations of the thirteenth through twenty-third aspects are possible, expect where implicitly or otherwise indicated to the contrary.

The articles "a" and "an" are used herein to refer to one or to more than one (i.e., to at least one) of the grammatical object of the article, depending on the context. By way of example, depending on the context, "an element" can mean one element or more than one element. The term "including" is used herein to mean, and is used interchangeably with, the phrase "including but not limited to". The terms "or" and "and" are used herein to mean, and are used interchangeably with, the term "and/or," unless context clearly indicates otherwise. The term "such as" is used herein to mean, and is used interchangeably, with the phrase "such as but not limited to".

Having thus described exemplary embodiments of the invention, it will be apparent to those skilled in the art that modifications of the disclosed embodiments will be within the scope of the invention. Alternative embodiments may, accordingly, include more modules, fewer modules and/or functionally equivalent modules. For example, the Application Stack Generator (ASG) may include or use any known graphical tool to generate stack cards. The present disclosure is relevant to various types of computer devices/systems such as but not limited to mobile computers, GPSs devices, mobile phones, gaming consoles, and so on. Hence the scope of the claims that follow is not limited by the disclosure herein to any specific computer device.

What is claimed is:

1. An apparatus comprising:
a display device including a display area, the display area including an active area, wherein an application stack in the display area is movable into and out of the active area, wherein the application stack being moved into the active area causes the application stack to be responsive to inputs received at a user interface to perform operations on stack cards of the application stack, and wherein the application stack being moved outside of the active area causes the application stack to be unresponsive to the inputs to perform operations on the stack cards; and
a processor, the processor configured to:
display at the display area a plurality of application stacks, each of the application stacks being movable into and out of the active area in response to user input, each of the application stacks including a corresponding plurality of stack cards and each of the application stacks having a corresponding stack card sequence, wherein each of the application stacks is associated with a corresponding computer application and each of the stack cards represents a corresponding content entity, and wherein each application stack is configured to be activated by selection of any one of the corresponding stack cards, conditioned on the corresponding application stack being in the active area;
display, in the display area, a first application stack and a second application stack of the plurality of application stacks such that the first application stack is displayed in its entirety and a portion of the second application stack is displayed proximate to an edge of the display area based on a first stacking policy rule of a plurality of stacking policy rules; and
display, in the display area, a stack card sequence of an application stack wherein the stack cards in the stack card sequence are ordered based on a second stacking policy rule of the plurality of stacking policy rules.

2. The apparatus of claim 1, wherein a sequential position of a particular stack card of the first application stack is alterable, while the first application stack is in the active area, by scrolling the particular stack card in the stack card sequence of the first application stack.

3. The apparatus of claim 1, wherein a particular stack card in the stack card sequence of the first application stack is removable from the stack card sequence, while the first application stack is in the active area, by scrolling among the plurality of stack cards in the stack card sequence of the first application stack.

4. The apparatus of claim 1, wherein the processor is operable to update a display of the application stacks by removing from one of the application stacks a selected stack card representing a corresponding content entity in response to the content entity associated with the selected stack card ceasing to satisfy a first rule.

5. The apparatus of claim 1, wherein the first application stack is deactivated in response to the first application stack being moved out of the active area, wherein deactivation prevents interaction with the first application stack.

6. The apparatus of claim 1, wherein in response to the first application stack being in the active area and prior to selection of a first particular stack card, the processor is configured to load a first background process via a first ancillary application associated with the first application stack, the first background process associated with preparing for user interaction with the first application stack.

7. The apparatus of claim 1, wherein in response to the first application stack being in the active area, selection of a first particular stack card of the first application stack activates the first application stack causing the processor to execute a first computer application corresponding to the first application stack to process a first content entity associated with the first particular stack card.

8. The apparatus of claim 1, wherein the processor is configured to, prior to display at the display area of a particular application stack, interact with the particular application stack via the corresponding computer application to perform one of deleting a stack card of the particular application stack, adding a new stack card to the particular application stack, and updating content associated with a particular stack card of the particular application stack.

9. The apparatus of claim 8, wherein deleting the stack card is performed in response to the corresponding content entity ceasing to satisfy at least one of the plurality of stacking policy rules.

10. The apparatus of claim 1, wherein at least one of the plurality of stacking policy rules is associated with a frequency of use of the corresponding computer application.

11. The apparatus of claim 1, wherein the first stacking policy rule and the second stacking rule are a same stacking rule of the plurality of stacking rules.

12. A computer device comprising:
an application stack generator;
a storage interface configured to interface with computer applications and content entities stored in a storage, wherein the application stack generator is operable to create application stacks and to associate each of the application stacks with a corresponding computer application wherein each of the stack cards represents a corresponding content entity; and
a display device including a display area, the display area including an active area, wherein an application stack in the display area is movable into and out of the active area, wherein the application stack being moved into the active area causes the application stack to be responsive to inputs received at a user interface to perform operations on stack cards of the application stack, and wherein the application stack being moved outside of the active area causes the application stack to be unresponsive to the inputs to perform operations on the stack cards;
a processor configured to:
display the application stacks at the display area, each of the application stacks being movable into and out of the active area in response to user input, each of the application stacks including a corresponding plurality of stack cards and each of the application stacks having a corresponding stack card sequence, wherein each of the stack cards represents a corresponding content entity, and wherein each application stack is configured to be activated by selection of any one of the corresponding stack cards, conditioned on the corresponding application stack being in the active area; display, in the display area, a first application stack and a second application stack of the plurality of application stacks such that the first application stack is displayed in its entirety and a portion of the second application stack is displayed proximate to an edge of the display area based on a first stacking policy rule of a plurality of stacking policy rules; display, in the display area, a stack card sequence of an application stack wherein the stack cards in the stack card sequence are ordered based on a second stacking policy rule of the plurality of stacking policy rules.

13. A method of facilitating interaction with content on a display device having a display area, the method comprising:
displaying on the display area of the display device a first application stack that is movable into and out of an active area of the display area, wherein the first application stack being moved into the active area causes the first application stack to be responsive to inputs received at a user interface to perform operations on first stack cards of the first application stack, and wherein the first application stack being moved outside of the active area causes the application stack to be unresponsive to the inputs to perform operations on the stack cards;
displaying, in the display area, the first application stack and a second application stack such that the first application stack is displayed in its entirety and a portion of the second application stack is displayed proximate to an edge of the display area based on a first stacking policy rule of a plurality of stacking policy rules; and
displaying, in the display area, a particular plurality of stack cards in a particular application stack wherein the particular plurality of stack cards are ordered in the particular application stack based on a second stacking policy rule of the plurality of stacking policy rules.

14. The method of claim 13, further comprising changing a displayed position of a first particular stack card in a first stack card sequence of the first application stack in the active area in accordance with a scrolling of the first particular stack card.

15. The method of claim 13, further comprising ceasing to display, on the display area, a first particular stack card associated with the first application stack in accordance with a scrolling of the first particular stack card among the plurality of stack cards.

16. The method of claim 13, wherein the first stacking policy rule and the second stacking rule are a same stacking rule of the plurality of stacking rules.

17. The method of claim 13, wherein each application stack in the active area is displayed with a high resolution on a display screen and each application stack that is not in the active area is displayed with a low resolution.

18. The method of claim 13, further comprising deactivating the first application stack in response to the first application stack being moved out of the active area, wherein deactivation prevents interaction with the first application stack.

19. The method of claim 13, further comprising in response to the first application stack being in the active area and prior to selection of a first particular stack card, loading a first background process via a first ancillary application associated with the first application stack, the first background process associated with preparing for user interaction with the first application stack.

20. The method of claim 13, further comprising interacting with the particular application stack via a corresponding computer application to perform one of deleting a stack card of the particular application stack, adding a new stack card to the particular application stack, and dynamically updating content associated with a particular stack card of the particular application stack.

21. The method of claim 13, wherein the first application stack and the second application stack are concatenated so that in response to the first application stack being dragged within the display area the second application stack is dragged within the display area.

22. A method comprising:
displaying, on a display area including an active area of a display device, an application stack that is movable into and out of the active area, wherein the application stack being moved into the active area causes the application stack to be responsive to inputs received at a user interface to perform operations on stack cards of the application stack, and wherein the application stack being moved outside of the active area causes the application stack to be unresponsive to the inputs to perform operations on the stack cards, and wherein, for each of a plurality of application stacks, each of the application stacks includes a corresponding plurality of stack cards and each application stack has a corresponding stack card sequence, each application stack of the application stacks being associated with a corresponding computer application that is activated by selecting any one of the plurality of stack cards of the application stack, wherein selection of a first stack card of a first application stack causes a processor to execute a first computer application to process a first content entity represented by the first stack card;

displaying, in the display area, a first application stack and a second application stack of the plurality of application stacks such that the first application stack is displayed in its entirety and a portion of the second application stack is displayed proximate to an edge of the display area based on a first stacking policy rule of a plurality of stacking policy rules; and displaying, in the display area, a particular application stack of the plurality of application stacks wherein the corresponding stack card sequence is ordered based on a second stacking policy rule of the plurality of stacking policy rules.

23. The method of claim 22, further comprising in response to the first application stack being in the active area and prior to selection of the first stack card of the first application stack, loading a first background process via a first ancillary application associated with the first application stack, the first background process associated with preparing for user interaction with the first application stack.

* * * * *